Mar. 13, 1923.
W. G. WILSON
ROTARY CUP VALVE
Filed May 23, 1921
1,448,585
7 sheets-sheet 2
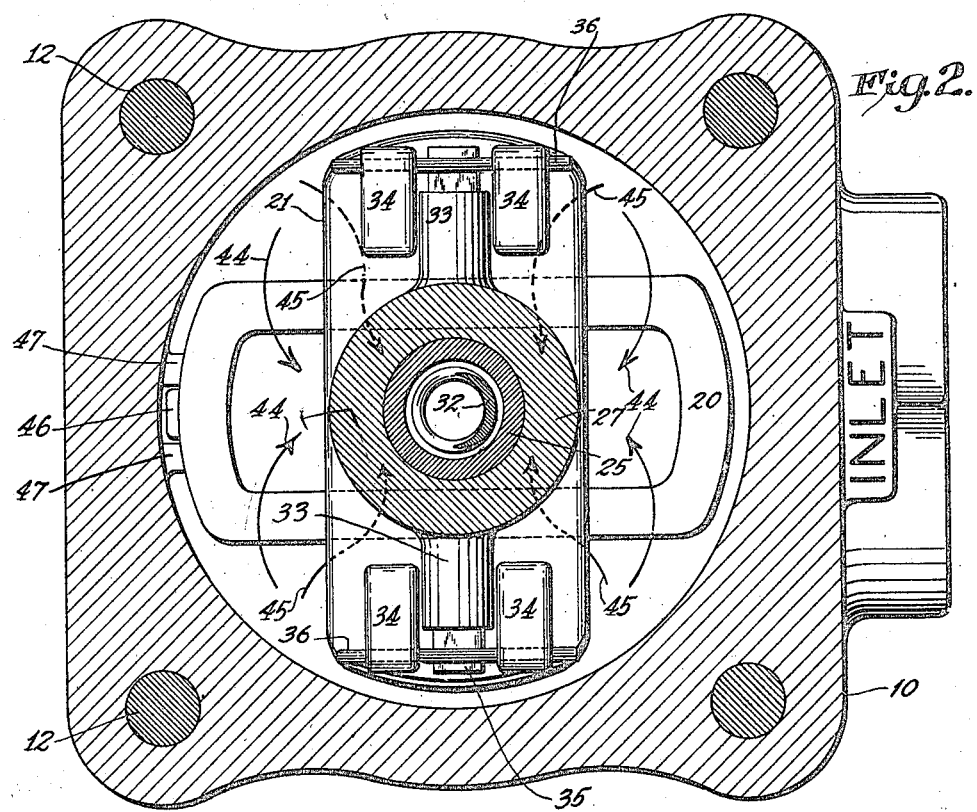
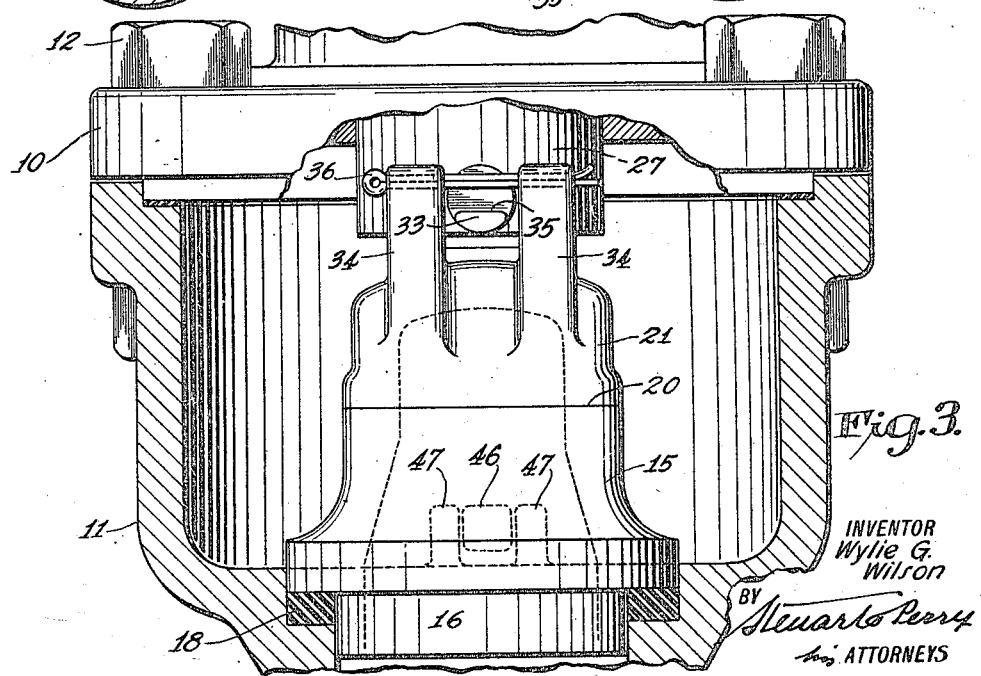
INVENTOR
Wylie G.
Wilson
BY Stewart Perry
his ATTORNEYS Mar. 13, 1923.

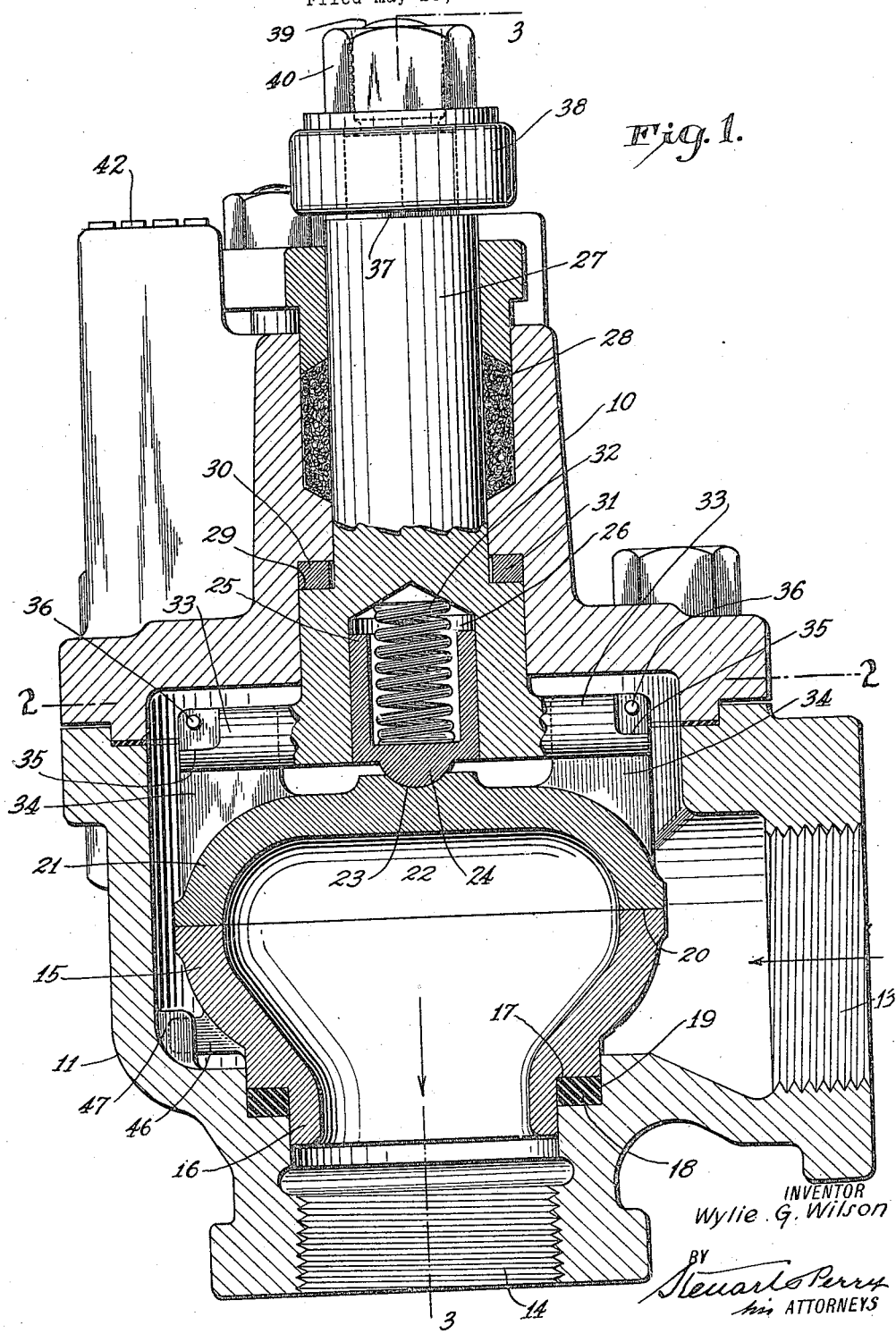

W. G. WILSON
ROTARY CUP VALVE
Filed May 23, 1921

INVENTOR
Wylie G. Wilson
BY
Steuart Perry
his ATTORNEYS

Mar. 13, 1923. 1,448,585
W. G. WILSON
ROTARY CUP VALVE
Filed May 23, 1921. 7 sheets-sheet 6

INVENTOR
Wylie G Wilson
BY
Stewart Perry
his ATTORNEYS

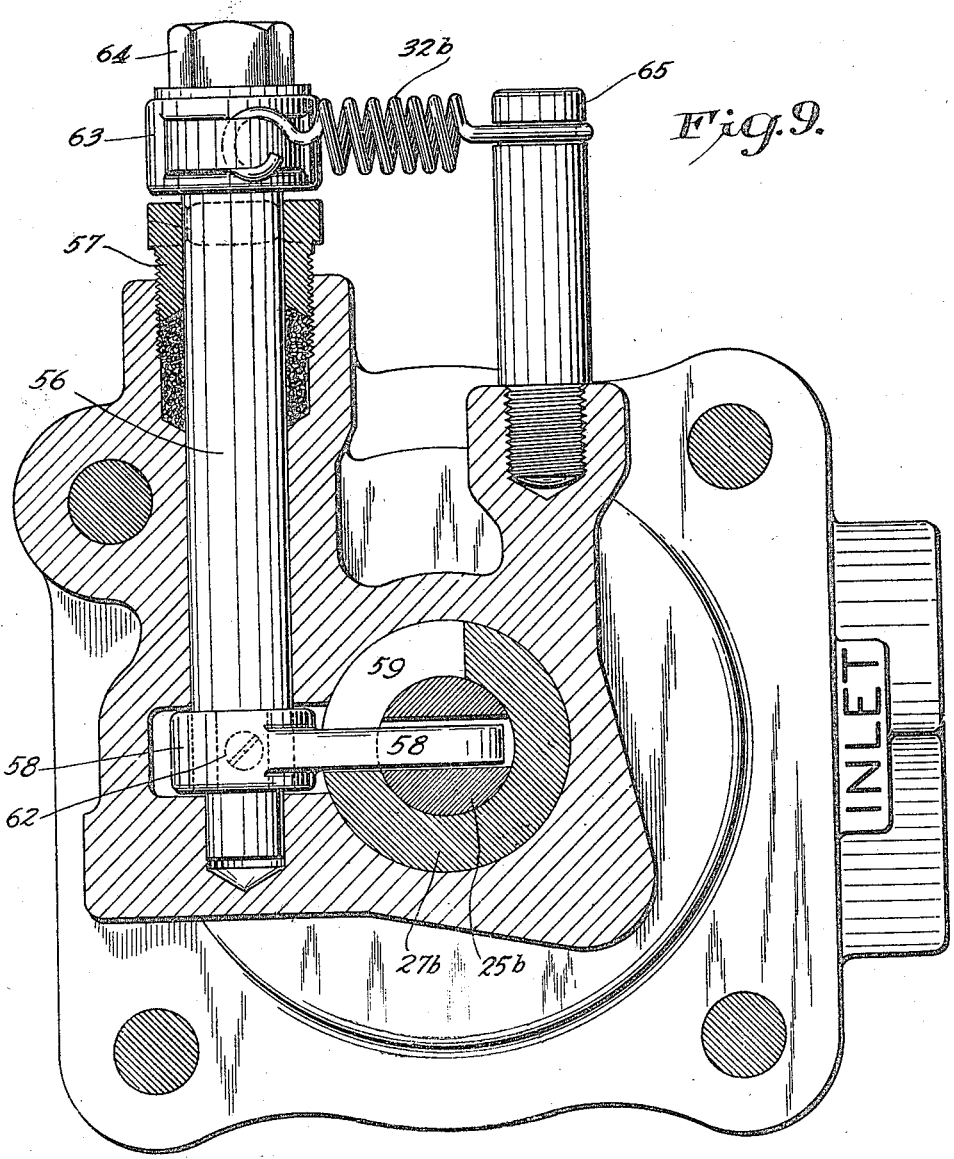

Patented Mar. 13, 1923.

1,448,585

UNITED STATES PATENT OFFICE.

WYLIE G. WILSON, OF NEW YORK N. Y., ASSIGNOR TO SLIDING VALVES INCORPORATED, A CORPORATION OF DELAWARE.

ROTARY CUP VALVE.

Application filed May 23, 1921. Serial No. 471,652.

*To all whom it may concern:*

Be it known that I, WYLIE G. WILSON, a subject of the King of Great Britain, and a resident of New York city, in the county of New York and State of New York, have invented certain new and useful Improvements in Rotary Cup Valves, of which the following is a specification.

This invention is a valve and may be graphically described as a rotary cup valve for the reason that the sealing member embodied in its construction is a cupped sealing member and is adapted to be moved from a sealing to a nonsealing position, and vice versa, through rotary movement.

The valve of the present invention embodies a seat on which a sealing member is rotatable and may be moved from sealing to nonsealing position, and vice versa, without leaving its seat, through rotation imparted to said sealing member by a valve stem or post positioned in perpendicular relation to the seat.

Valves embodying sealing members which are rotated from sealing to nonsealing position, and vice versa, through a valve stem positioned perpendicular to the valve seat, are well known. In the known valves of this character, the sealing member is provided with one or more ports and operates on a seat provided with one or more ports, so that through rotation of the sealing member, the ports of such member and of the seat are brought into and out of registration.

The practical disadvantage in a valve of such character is the fact that the capacity of the valve must necessarily be relatively small in comparison to the port opening, so that for a given capacity, a relatively large valve casing and correspondingly large sealing member and valve seat are necessary. This not only necessitates large and bulky valves for small capacities, but also renders such valves comparatively expensive.

With these considerations in mind, the prime object of the present invention is to provide a valve, which may be economically manufactured and sold at a relatively low cost and which will for a given capacity be of a materially less size than has heretofore been considered practical in valves of the character under consideration.

An important feature of the present invention resides in the extreme simplicity of construction and the relatively few parts requiring machining or precision in their manufacture.

Of marked practical importance is the fact that the parts of the valve of this invention, when the same is constructed in its preferred forms, may be conveniently and expeditiously dismantled for repair or replacement without necessitating the uncoupling of the valve from the system in which it may be included. In this way, repairs or replacements may be economically made without undue loss of time.

Speaking generally, the valve of the present invention embodies a non-circular valve seat with which cooperates a correspondingly shaped sealing member, the sealing side of which is cupped or recessed. In practice, the sealing member and its seat may partake of various forms. For example, it may be triangular, star shape or of other configuration, but may be conveniently manufactured in oval or oblong form. The valve is held to its seat by elastic pressure, preferably imposed thereon by a spring, and cooperating with the sealing member is a stem or post to which the sealing member is locked against relative rotation, but with respect to which the sealing member may be graphically referred to as in floating relation. In other words, while rotary movement may be imparted to the sealing member by the post, the method of securing the post to the sealing member is such as to allow of universal movement between the parts so as to permit the sealing member to find a proper seat.

When the sealing member is in sealing position it coincides with its seat, but when the post is operated to rotate said member through, for example, 90 degrees, the sealing member is moved out of coinciding relation and into a position wherein its longer dimension will extend in a direction transversely of the seat. When in this position, material is adapted to flow through the valve casing through the uncovered portion of the port of the seat and also under the uncovered portions of the recess in the sealing member and so through the seat port to the discharge side of the valve.

It will be apparent, from the foregoing general description, that the flow of material through the valve, when the sealing member is in unsealed position, will be in practically the same volume as would result if the sealing member were actually lifted from its seat to allow of the unrestricted passage of fluid through the port of the seat. This construction permits the employment of a relatively small valve for the handling of relatively large capacities.

Features of the invention, other than those adverted to, will be apparent from the hereinafter detailed description and claims, when read in conjunction with the accompanying drawings.

The accompanying drawings illustrate different practical embodiments, but the constructions therein shown are to be understood as illustrative, only, and not as defining the limits of the invention.

Figure 1 is a central section of a valve embodying the present invention, showing certain parts in elevation in the interest of clearness.

Figure 2 is a horizontal section on the line 2—2 of Figure 1.

Figure 3 is a fragmental section on the line 3—3 of Figure 1, showing the sealing member and its seat, as well as other portions of the valve in elevation.

Figure 4:
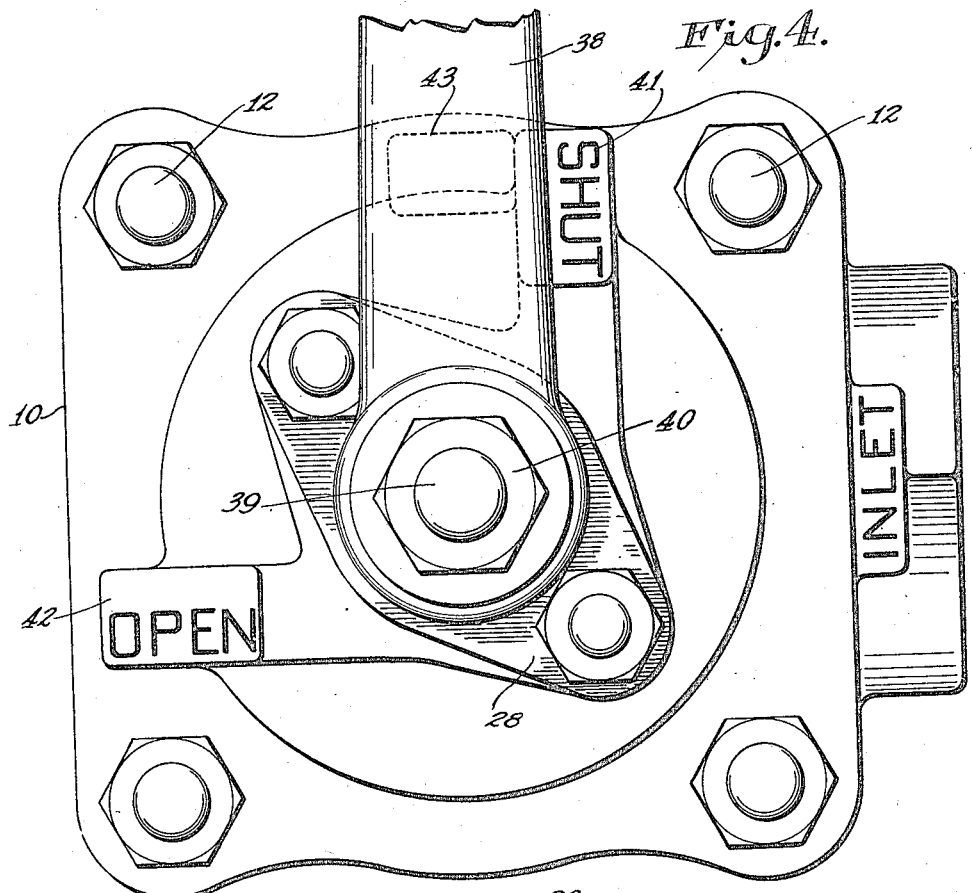
Figure 4 is a plan view of the valve shown in Figures 1-3, inclusive.
Figure 5:
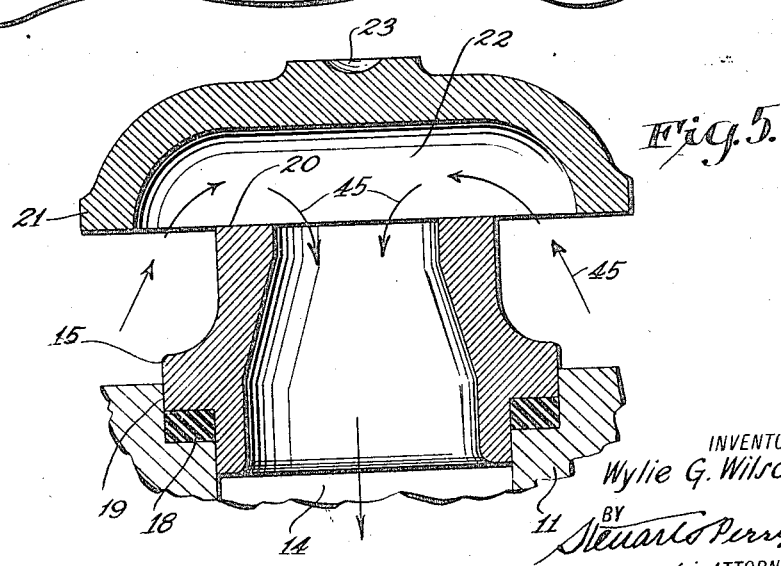
Figure 5 is a fragmental section corresponding to the showing of Figure 3, but illustrating the sealing member in its unsealed position.

Referring to the drawings, and particularly to the form of the invention as illustrated in Figures 1-5, inclusive, the valve casing is shown in two parts designated 10 and 11, the upper part 10 of which is secured to the lower part 11 by means of bolts 12. 13 designates the inlet passage of the valve casing and 14 the outlet passage.

In this form of the invention, the valve seat member 15 is made separate from the valve casing and detachably seated in the lower portion 11 of the casing. The seat member is formed circular at its lower portion 16, which is adapted to extend into the outlet passage 14 of the casing. The cylindrical portion of the seat member 15 terminates in a shoulder or abutment 17, which seats on a gasket 18 received within a cylindrical step 19 surrounding the outlet passage of the valve as clearly shown in Figures 1 and 3. The advantage of this construction is that the joint between the seat member and the casing is stepped or off-set and the gasket 18 is completely housed between the parts so that when pressure is exerted on the seat member, the gasket 18 will be compressed within a confined space in such manner that it cannot bulge out, but will be forced to produce a tight liquid impervious joint.

The upper edge 20 of the sealing member constitutes what is generally termed in the art a valve seat and as hereinbefore pointed out, the shape of this seat may vary, but, in the showing of Figures 1-3, this seat is shown as oval or oblong in configuration, which shape is imparted thereto by elongating in one direction and contracting in the other direction the circular configuration of the base portion 16 of the seat member. In other words, the seat is of less width than the diameter of the sealing member at its base, but is of considerably greater length as clearly shown in Figure 2. In this manner, the cross sectional area is substantially the same though a change in shape is effected.

In practice, the seat 20 is machined to provide a plane surface and is adapted for co-operation with the lower face of the sealing member 21. The seating face of this sealing member is of the same shape as the seat 20 and its under surface is cupped or hollowed out to form a recess 22, while its upper surface is arched over to render the wall of the sealing member of substantial uniform thickness throughout. This sealing member 21 closely simulates a cup shape and will, for convenience of description, be hereinafter termed the "cup" of the valve.

The top of the cup is provided with a depression 23 of spherical configuration and in this depression seats a complementarily shaped heel 24 of a hollow plunger 25, which is mounted for longitudinal adjustment within a pocket 26 in the lower end of a post or valve stem 27.

The post 27 extends upwardly through the upper section 10 of the valve casing and is packed with a suitable stuffing box 28. Said post is furthermore provided with an enlarged lower portion, the upper edge of which forms a seat 29 positioned in opposed relation to the seat 30 formed in the valve casing and between these two seats is positioned a gasket 31. A spring 32 is housed within the plunger 25 and its opposite ends bear against the base of the plunger and the base of the pocket 26. By associating the parts in this manner, the spring 32 forces the plunger 25 in a downward direction and imposes its pressure through the heel 24 directly upon the cup 21 for the purpose of firmly holding the cup to the seat 20. The thrust of the spring is opposed by the gasket 31 between the shoulders 29 and 30, so that the spring not only holds the cup to its seat, but also effects a relatively impervious joint at the gasket 31. Any leakage at this joint is, however, taken care of by the stuffing box 28.

The lower end of the post 27 is provided with oppositely extending arms 33, which extend between upstanding lugs 34 formed rigid with the cup 21, as best shown in Figures 2 and 3. The extreme ends of the arms 33 are cut away as shown at 35 and through these cut away portions cotter pins 36 extend. These cotter pins are of the split variety and extend through the juxtaposed lugs 34 and across the arms 33 and the ends of these pins are separated as shown in Figure 3 to preclude their inadvertent displacement. This arrangement locks the post 27 and the cup 21 together for simultaneous rotation, while producing, in effect, a floating connection between the cup and the post, so that the cup may properly come to a seat at all times.

The upper end of the post, or that portion thereof which projects above the stuffing box 28 is made polygonal as shown at 37 for the reception of a wrench 38. This wrench may be of any suitable kind and may be removable if desired. However, for the purpose of illustration, a threaded portion 39 is shown as projecting from the polygonal portion 38 and is adapted to receive a nut 40 for holding the wrench 38 in position.

As shown in Figure 4, the wrench 38 is adapted for operation through substantially 90 degrees, the termini of which movement may be limited by stops 41 and 42, which may be designated "shut" and "open," respectively. A lug 43 formed on the wrench is adapted to engage with these stops as will be apparent from Figure 4.

When the wrench is in the position shown in Figure 4, with the lug 43 in engagement with the stop 41, the parts will appear in the relation illustrated in Figure 1, wherein the cup 21 is shown in a position to coincide with the seat 20 and seal the valve against the passage of material therethrough. However, if the wrench is moved from the position of Figure 4, in a counterclockwise direction through substantially 90 degrees to bring the lug 43 into engagement with the stop 42, the post 27 will be rotated and through the arms 33 and lugs 34, will impart rotation to the cup 21 to rotate the cup on its seat into the position shown in Figure 5.

During this movement, it will appear that the line of direction of the pressure, exerted by the spring 32, i. e., the resultant of the pressure of such spring, will be coaxial with the post 27 and will be directed upon the exact center of the sealing member and its seat. Accordingly, there will be absolutely no tendency of the cup to tilt out of contact with the seat nor any tendency of the seat to tilt out of contact with the cup or on the gasket 18. When the cup has been moved to the open position shown in Figure 5, it will further appear that fluid passing through the valve may take four distinct courses. That is to say, such fluid may flow from the intake passage 13 through the port of the valve seat at either side of the cup as shown by the arrows 44 in Figure 2 and at the same time such fluid may pass beneath the cup and through the recess 22 in the base thereof into the port of the valve seat as shown by the arrows 45 in Figures 2 and 5. The seat 20 is practically entirely uncovered, so that the valve cup does not seriously interfere with the passage of the fluid through the valve. In this way, maximum capacity is obtained in a relatively small valve of the non-lift rotary type.

As hereinbefore stated, the seat member 15 is seated loosely in the lower section 11 of the valve casing and is firmly held to its seat entirely by the force of the spring 32 and the fluid pressure acting against the cup. In order to prevent rotation of the seat member, when the cup is rotated, said seat member may be anchored in any suitable way, such for example as by providing it with a projecting tongue 46 adapted to occupy a position between the lugs 47 cast on the valve casing as best shown in Figures 1, 2 and 3. This arrangement holds the seat against rotation while permitting a proper seating thereof on the gasket 18.

In the construction of Figure 1, the inlet and outlet pasages 13 and 14, respectively, of the valve casing are shown as positioned at substantially 90 degrees to one another, but the present invention is not restricted to a valve of these particular characteristics. Thus, in Figure 6 of the drawings, a valve is shown wherein the inlet and exhaust passages are in substantial alinement. The valve shown in Figure 1 is adapted to be coupled into a pipe line at a turn or change of direction therein, while the valve shown in Figure 6 may be coupled into a straight run of piping. In this latter figure, the inlet passage is designated 13$^a$ and the outlet passage 14$^a$. The other parts of the valve are constructed in the same manner as described with reference to the valve of Figures 1–5.

Figure 6:
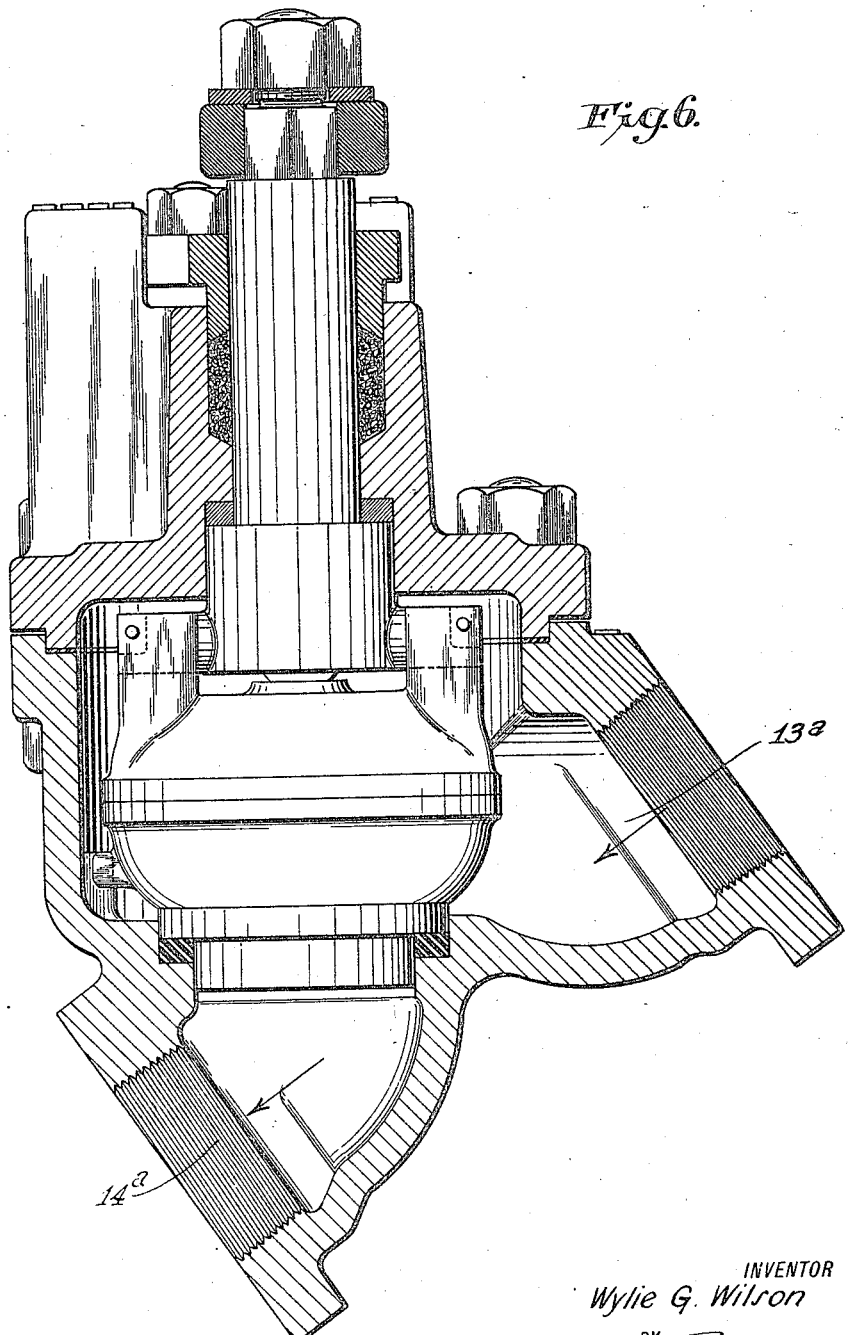
Figure 6 shows a slightly modified form of valve with the valve casing in section and the remaining parts in elevation.

In the valve shown in Figure 6, as well as that of Figures 1–5, the spring is housed within the hollow plunger 25, and while out of the actual path of the material passing through the valve, is subject to the action of such material due to seepage past the plunger 25. Accordingly, valves of this character are particularly adapted to control the flow of liquids which would not have a serious corroding or otherwise depreciating effect on the spring.

Figure 7:
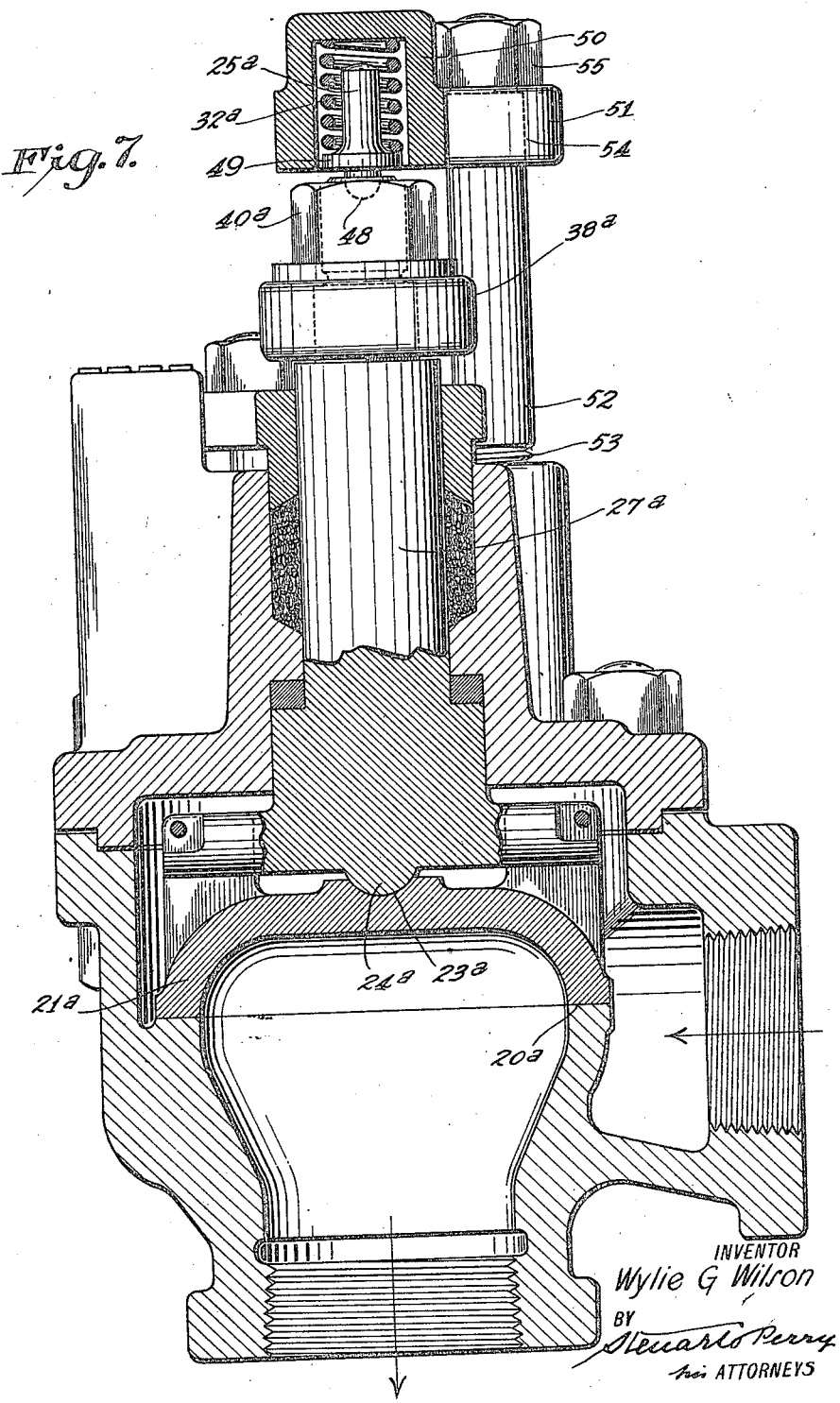
Figures 7 and 8 are central sections through valves of different modified forms; and, Figure 9 is a section on the line 9—9 of Figure 8.
Figure 8:
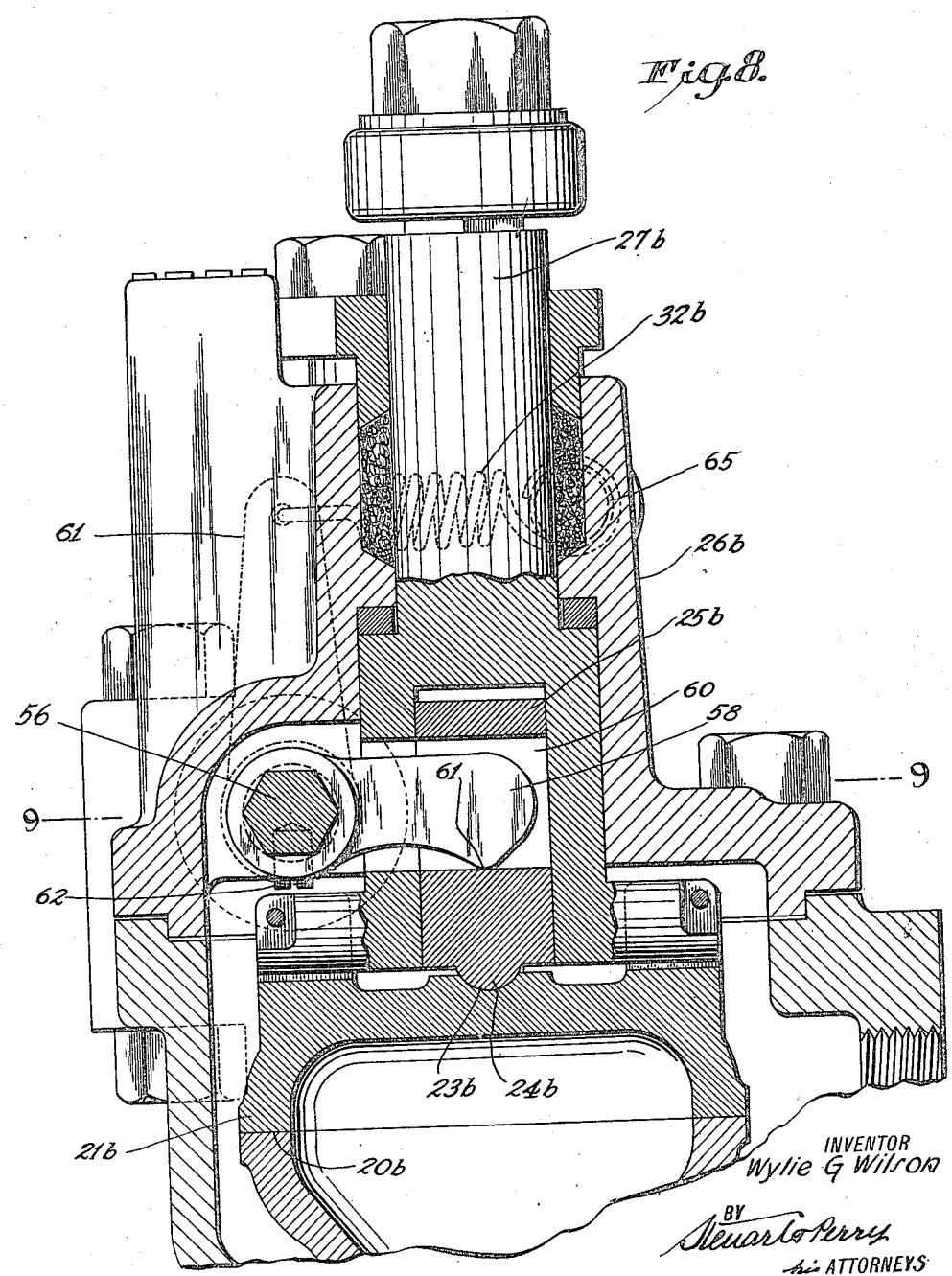

In valves adapted to control the flow of acids, the spring may be positioned in such manner as to be removed from the action of the fluid controlled by the valve and in Figures 7, 8 and 9, I have shown two different constructions wherein the spring is so placed.

In the construction of Figure 7, the plunger at the base of the post $27^a$ is omitted and the post is, instead, provided with a depending hemispherical shaped heel $24^a$, which is adapted to articulate within a correspondingly shaped depression $23^a$ formed in the top of the cup in the same manner as the heel 24 of the plunger cooperates with the depression in the cup of the construction of Figure 1. The cup is associated in a floating manner with the post in the same way as described with reference to Figure 1 and cooperates with a seat $20^a$ which, instead of being formed on a removable seat member, such as the seat member 15 is machined on a portion of the valve casing cast for this purpose as clearly shown in Figure 7.

It will be understood, however, that the valve of Figure 7 might be, if desired, provided with a seat member, as shown in Figure 1, and, conversely, if desired the seat of the valve of Figure 1 may be formed rigid and integral with the casing after the manner shown in Figure 7.

The upper end of the post is shaped in the same manner as described with reference to Figure 1 for the reception of a wrench $38^a$ adapted to be locked in place by a nut $40^a$. The extreme upper end of the post, however, is provided with a socket 48 adapted to receive the lower end of a plunger $25^a$. This plunger is provided intermediate its ends with an annular flange 49 on the upper face of which is adapted to seat a spring $32^a$. The spring is housed within an inverted cap 50 in the base of which the upper end of the spring seats and this cap is provided with a laterally extending integral arm 51. A cylindrical post 52, provided at its lower end with a threaded portion 53, is adapted to be screwed into a tapped hole in the upper section of the valve casing and the post extends upwardly through a cylindrical hole 54 in the arm 51 and that portion of the post which extends above the arm is threaded to receive a nut 55. By screwing down on the nut 55, or by turning the post 52 into the tapped hole of the valve casing, the cap 50 may be drawn down to place the spring $32^a$ under compression and thereby impel the post $27^a$ in a direction toward the valve seat for the purpose of holding the cup tightly to the seat. In other words, the spring $32^a$ which is positioned exteriorly of the valve has the same function as the spring 32 in the valve of Figure 1. By positioning the spring $32^a$ exteriorly of the valve casing, it is free from the action of fluids passing through the valve and consequently will not be damaged thereby.

In the valve of Figures 8 and 9, the spring which holds the cup to its seat is also positioned exteriorly of the valve casing, but the construction is somewhat different from that shown in Figure 7. In the valve of Figures 8 and 9, a spindle or rock shaft 56 is mounted for oscillation in the upper section of the valve on an axis perpendicular to the axis of the post $27^b$. The rock shaft 56 has a suitable stuffing box 57 associated therewith to obviate leakage and fixed to the inner end of said shaft is an operating arm 58 secured to the shaft by a set screw 62. This operating arm extends in a lateral direction through a segmental slot 59 in the lower portion of the post $27^b$ and into a slot 60 formed in the plunger $25^b$. The plunger is mounted for vertical reciprocation in a pocket $26^b$ in the lower portion of the post and is provided at its lower end with a hemispherical heel $24^b$ adapted to seat in a correspondingly shaped socket $23^b$ in the cup $21^b$. The inner end of the operating arm 58 is provided with a nose 61 adapted to engage with the plunger at the lower end of the slot 60 at all times under elastic pressure for the purpose of forcing the plunger $25^b$ against the cup $21^b$, so as to hold the cup firmly to its seat $20^b$.

The rock shaft 56 projects beyond the stuffing box 57 and such projecting portion has mounted thereon an arm 63 held in place by a nut 64. The spring $32^b$ is secured at one of its ends to the outer end of the arm 63 and its opposite end is hooked about a post 65 which is screwed into a tapped hole in the casing as clearly shown in Figure 9. The tension of the spring $32^b$ exerted on the arm 63 serves to maintain the nose 61 of the operating arm 58 firmly against the plunger $25^b$ at the lower end of the slot and thereby hold the cup to its seat. Manifestly, therefore, the function of the spring $32^b$ is identical with the function of the spring 32 and though operating through different mechanism, the same result is effected.

It will be noted from the foregoing detailed description of the several forms of the invention shown in the drawings, that my invention herein lies in using a cupped sealing member of non-circular form, in combination with a seat, the edges of which are preferably raised above the adjacent portions of the casing and which seat is in the form of a relatively narrow band, so that when the cup is rotated on an axis perpendicular to its seat, liquid may flow through the uncovered portions of the seat port and also under the uncovered portions of the cup and so into the seat port. The seat may, in practice, be formed either integral with the valve casing or may be simply set therein on a suitable gasket, but in any event, the sealing member preferably has floating association with the operating post and is held to its seat by elastic pressure.

The parts of the valve of this invention may be made of any desired material, and, in practice, the sealing member as well as other parts of the valve may be formed of glass, since the valve will not be subjected to any shock as the sealing member is yieldingly held to its seat and simply revolves when operated upon by the post.

The functions of the spring are in reality two-fold. Its prime function is to hold the cup to its seat with elastic pressure, while the valve is in use and in the second instance, the spring serves to hold the parts properly assembled against disengagement due to jar or careless handling during installation or transportation of the valve prior to installation.

A notable feature of the valves shown in the drawing is their simplicity of construction and the ease with which the essential parts of the valve can be replaced without removing the valve from the pipe line in which it is included. Another important feature of the invention resides in the fact that the spring exerts pressure on the exact center of the cup and seat, thereby eliminating any tendency on the part of the seat member to tilt on the casing face with which it co-acts, and retaining a fluid tight joint between the seat member and the casing.

In practice the joint between the seat member and the casing is usually made with a gasket, such as is shown in the drawings, so as to avoid the necessity of fine workmanship, but in cases where the fluid handled would attack a soft gasket, such as is shown in the drawings, a jointing cement of litharge and glycerine, chemical wax, lead, or other suitable substance may be used, or a fluid tight joint produced by grinding the co-acting surfaces of the seat and casing.

It will be apparent from the foregoing specification that the present invention is based on certain well defined principles of construction and mode of operation and while the drawings show different ways in which the invention may be practiced, I wish it understood that the invention is not restricted to the specific showing made, but is as broadly novel as is commensurate with the appended claims.

Having thus fully described the invention, what I claim as new and desire to secure by Letters Patent is:

1. A valve embodying a seat provided with a non-circular port, a non-circular sealing member cooperating with the seat, and provided on its sealing side with a recess, and means for rotating the sealing member on its seat to seal or unseal the port, in which latter instance fluid, passing through the valve, is free to flow over the sealing member and through the port and also under the sealing member and through the recess into the port.

2. A valve embodying a seat provided with a non-circular port, a non-circular sealing member cooperating with the seat, and provided on its sealing side with a recess, means for rotating the sealing member on its seat to seal or unseal the port, in which latter instance fluid, passing through the valve, is free to flow over the sealing member and through the port and also under the sealing member and through the recess into the port and means for holding the sealing member to its seat at all times under elastic pressure.

3. A valve embodying a casing provided interiorly with a raised non-circular seat having a non-circular port therein, a non-circular sealing member cooperating with the seat and provided on its sealing side with a non-circular recess, and means for rotating the sealing member to seal or unseal the port, in which latter instance fluid, passing through the valve, is free to flow over the sealing member and through the port and also under the sealing member and through the recess into the port.

4. A valve embodying a casing provided interiorly with a raised non-circular seat having a non-circular port therein, a non-circular sealing member cooperating with the seat and provided on its sealing side with a non-circular recess, means for rotating the sealing member to seal or unseal the port, in which latter instance fluid, passing through the valve, is free to flow over the sealing member and through the port and also under the sealing member and through the recess into the port, and means for holding the sealing member to its seat at all times under elastic pressure.

5. A valve embodying a cupped sealing member of non-circular form in combination with a raised non-circular seat provided with a port, and means for rotating the cupped sealing member so that when the cup is rotated on its axis into unsealing position, fluid may flow through the uncovered portions of the port and also under the uncovered portions of the cup and thence into the port.

6. A valve embodying a cupped sealing member of non-circular form in combination with a raised non-circular seat provided with a port, means for rotating the cupped sealing member so that when the cup is rotated on its axis into unsealing position, fluid may flow through the uncovered portions of the port and also under the uncovered portions of the cup and thence into the port, and means for exerting elastic pressure on the cupped sealing member for holding said member at all times firmly to its seat.

7. A valve embodying a casing, a seat member detachably positioned within the casing and provided with a raised non-circular seat, a gasket positioned between the seat member and the casing, and means for securing the seat member against rotation, in combination with a cupped sealing member of non-circular form cooperating with the seat, means for rotating the sealing member on the seat and means for forcing the sealing member under elastic pressure against the seat member and simultaneously forcing the seat member tightly against the gasket to provide an impervious joint thereat.

8. In a rotary valve of the class described, the combination of a cup shaped member of elongated cross section presenting a port aperture of greater length than width, and a ported member having one end shaped so as to form an opening of the same configuration and dimensions as the port aperture of the cup shaped member and cooperating with said member so that when said members are rotated one on the other the combined port openings formed when said members are in right-angular relation are approximately equal to the individual port opening in each of said members.

9. In a rotary valve of the class described, the combination of a cup shaped member of elongated cross section presenting a port aperture of greater length than width, and a ported member having one end shaped so as to form an opening of the same configuration and dimensions as the port aperture of the cup shaped member and cooperating with said member so that when said members are rotated one on the other the combined port openings formed when said members are in right-angular relation are approximately equal to the individual port opening in each of said members, said members being mounted in the line of a common axis with means operating in the line of said axis to hold the same in juxta-position by elastic pressure and means operating in the same axis to relatively rotate the same from closed to open position, and vice versa.

10. In a rotary valve of the class described, the combination of a cup shaped member of elongated cross section presenting a port aperture of greater length than width, and a ported member having one end shaped so as to form an opening of the same configuration and dimensions as the port aperture of the cup shaped member and cooperating with said member so that when said members are rotated one on the other the combined port openings formed when said members are in rightangular relation are approximately equal to the individual port opening in each of said members, said members being mounted in a common axis, one secured against rotation and the other rotatable, with means to maintain their faces in juxta-position by an elastic pressure and means to accomplish relative rotation between said members so that the faces thereof may be brought into registration to form a seal, or rotated to form a port opening.

Signed by me at New York city, N. Y., this 9th day of May 1921.

WYLIE G. WILSON.

Witnesses:
WM. F. MADILL,
ETTA DONNELLY.